US006944673B2

(12) United States Patent
Malan et al.

(10) Patent No.: US 6,944,673 B2
(45) Date of Patent: Sep. 13, 2005

(54) METHOD AND SYSTEM FOR PROFILING NETWORK FLOWS AT A MEASUREMENT POINT WITHIN A COMPUTER NETWORK

(75) Inventors: Gerald R. Malan, Ann Arbor, MI (US); Farnam Jahanian, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 607 days.

(21) Appl. No.: 09/855,809

(22) Filed: May 15, 2001

(65) Prior Publication Data

US 2002/0032717 A1 Mar. 14, 2002

Related U.S. Application Data

(60) Provisional application No. 60/231,480, filed on Sep. 8, 2000, provisional application No. 60/231,481, filed on Sep. 8, 2000, and provisional application No. 60/231,479, filed on Sep. 8, 2000.

(51) Int. Cl.[7] .............................................. G06F 15/16
(52) U.S. Cl. ...................... 709/237; 709/224; 709/248
(58) Field of Search ................................ 709/203, 220, 709/224, 237, 248; 710/104; 713/1, 100; 703/20, 27; 370/379, 389, 392

(56) References Cited

U.S. PATENT DOCUMENTS

| | | |
|---|---|---|
| 4,817,080 A | 3/1989 | Soha |
| 5,179,549 A | 1/1993 | Joos et al. |
| 5,231,593 A | 7/1993 | Notess |
| 5,243,543 A | 9/1993 | Notess |
| 5,511,122 A | 4/1996 | Atkinson |
| 5,550,984 A | 8/1996 | Gelb |
| 5,559,814 A | 9/1996 | Rolin et al. |
| 5,570,346 A | 10/1996 | Shur |
| 5,606,668 A | 2/1997 | Shwed |
| 5,623,601 A | 4/1997 | Vu |
| 5,649,107 A | 7/1997 | Kim et al. |
| 5,673,322 A | 9/1997 | Pepe et al. |
| 5,761,191 A | 6/1998 | VanDervort et al. |
| 5,774,667 A | 6/1998 | Garvey et al. |
| 5,778,174 A | 7/1998 | Cain |

(Continued)

OTHER PUBLICATIONS

Brownlee, C., et al., RFC2063, Internet RFC, Jan. 31, 1997, pp. 1–26, xp–002189311, HTTP;//WWW.FAOS.ORG/RFCS/RFC2063.htm.

Mansfield, Glenn, et al., Detection Defense, and Tracking of Internet–Wide Illegal Access In A Distributed Manner, INET 2000, Jul. 18–21, 2000, pp. 1–12, XP–002189312, http://www.isoc.org/inet2000/cdproceedings/lf/lf–2.htm.

Mansfield, Glenn, et al., Towards Trapping Wily Intruders In the Large, Sep. 7–9, 1999, pp. 1–13, XP–002189313, http://www.ipa.go.jp/security/fyll/report/contents/intrusion/ids/raid1999glenn.pdf.

David, Jon, et al., Results Of The Distributed–Systems Intruder Workshop, Dec. 7, 1999, pp. 1–20, XP–002189314, Pennsylvania, http://packetstorm.widexg.n1/distributed/d.

*Primary Examiner*—Majid Banankah
(74) *Attorney, Agent, or Firm*—Brooks Kushman P.C.

(57) ABSTRACT

A method and system for profiling network flows at a measurement point within a computer network is provided. The method includes measuring network flows having invariant features at a measurement point located within routing infrastructure of the computer network to obtain flow statistics. The method also includes aggregating the flow statistics to obtain a traffic profile of the network flows at the measurement point. The method and system utilize the natural hierarchy in the Internet addressing scheme to provide a means for making tractable measurements of network traffic in high-speed networks. Moreover, the method and system adapt dynamically to the changing underlying traffic characteristics to maintain a maximum memory footprint for the profiles. The method and system adapt by adjusting the level of aggregation of the traffic endpoints along a scale from Interface to fully specified network address.

20 Claims, 11 Drawing Sheets

U.S. PATENT DOCUMENTS

| | | |
|---|---|---|
| 5,781,534 A | 7/1998 | Perlman et al. |
| 5,805,803 A | 9/1998 | Birrell et al. |
| 5,828,833 A | 10/1998 | Belville et al. |
| 5,835,726 A | 11/1998 | Shwed et al. |
| 5,864,666 A | 1/1999 | Shrader |
| 5,864,683 A | 1/1999 | Boebert et al. |
| 5,878,143 A | 3/1999 | Moore |
| 5,884,025 A | 3/1999 | Baehr et al. |
| 5,898,830 A | 4/1999 | Wesinger, Jr. et al. |
| 5,958,052 A | 9/1999 | Bellovin et al. |
| 5,960,177 A | 9/1999 | Tanno |
| 5,961,645 A | 10/1999 | Baker |
| 5,968,176 A | 10/1999 | Nessett et al. |
| 5,991,881 A | 11/1999 | Conklin et al. |
| 5,996,011 A | 11/1999 | Humes |
| 6,003,133 A | 12/1999 | Moughanni et al. |
| 6,052,788 A | 4/2000 | Wesinger, Jr. et al. |
| 6,061,331 A | 5/2000 | Conway et al. |
| 6,061,797 A | 5/2000 | Jade et al. |
| 6,067,569 A | 5/2000 | Khaki et al. |
| 6,076,168 A | 6/2000 | Fiveash et al. |
| 6,078,953 A | 6/2000 | Vaid et al. |
| 6,088,796 A | 7/2000 | Cianfrocca et al. |
| 6,088,804 A | 7/2000 | Hill et al. |
| 6,134,658 A | 10/2000 | Multerer et al. |
| 6,134,662 A | 10/2000 | Levy et al. |
| 6,243,667 B1 * | 6/2001 | Kerr et al. .................... 703/27 |
| 6,446,200 B1 * | 9/2002 | Ball et al. ....................... 713/1 |
| 6,625,657 B1 * | 9/2003 | Bullard ....................... 709/237 |
| 6,789,203 B1 | 9/2004 | Bellisent |

* cited by examiner

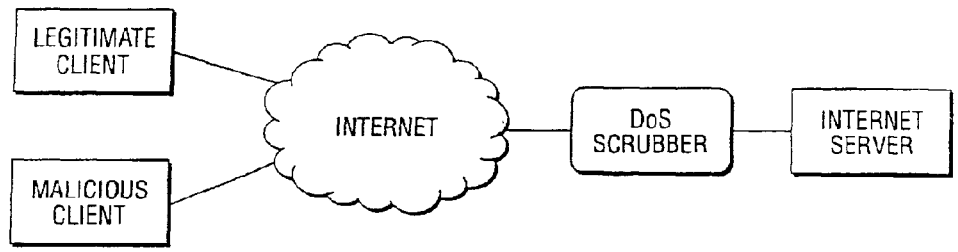
Fig. 1
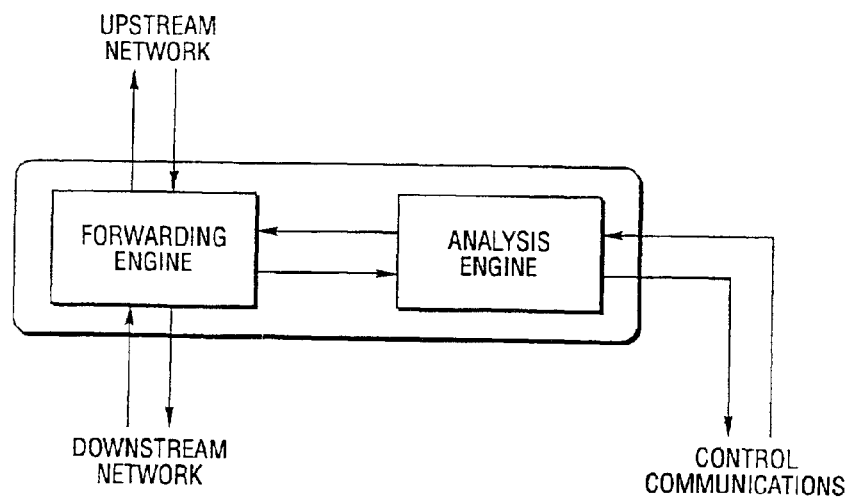
Fig. 2
Fig. 3a
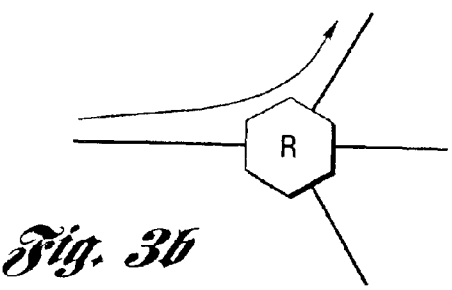
Fig. 3b

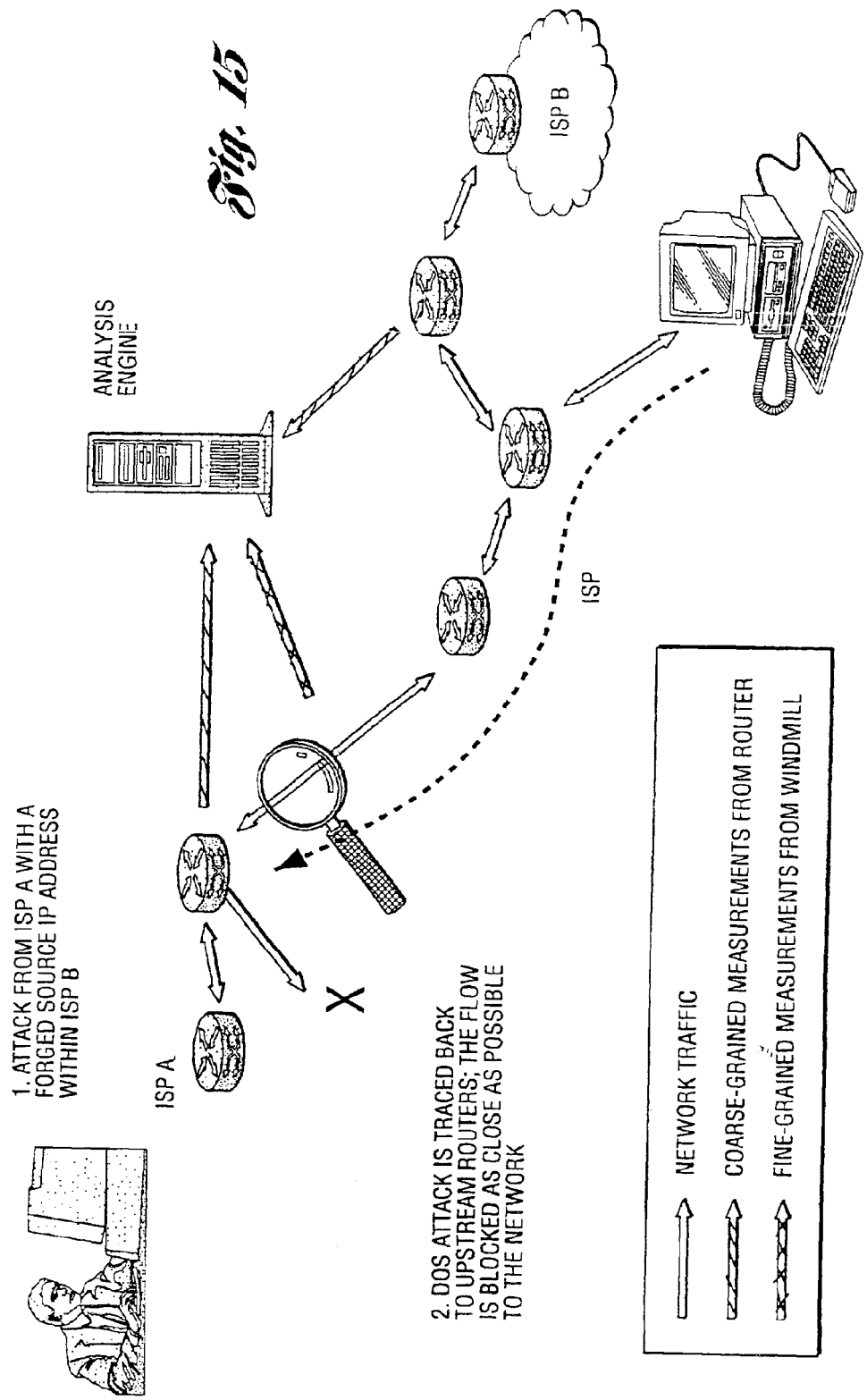

METHOD AND SYSTEM FOR PROFILING NETWORK FLOWS AT A MEASUREMENT POINT WITHIN A COMPUTER NETWORK

CROSS-REFERENCE TO RELATED APPLICATIONS

This application claims the benefit of the following U.S. provisional applications: "Denial of Service Detection and Tracking", filed Sep. 8, 2000 and having U.S. Ser. No. 60/231,480; "Hierarchical Network Profiling" also filed Sep. 8, 2000 and having U.S. Ser. No. 60/231,481; and "Denial of Service Scrubber" also filed Sep. 8, 2000 and having U.S. Ser. No. 60/231,479.

STATEMENT REGARDING FEDERALLY SPONSORED RESEARCH OR DEVELOPMENT

This invention was made with government support under Contract No. F30602-99-1-0527 awarded by DARPA. The government has certain rights to the invention.

BACKGROUND OF THE INVENTION

1. Field of the Invention

This invention relates to methods and systems for profiling network flows at a measurement point within a computer network.

2. Background Art

Given the explosive growth of the Internet and increasing reliance on the Web for accessing information and conducting commerce, there is an accelerating demand for solutions to security problems as corporations and others launch e-commerce strategies and begin migrating mission critical applications to the Internet. Security is now a business requirement—the actual loss in revenue combined with intangible costs in reputation and customer confidence are only exacerbated by the fierce competition that the Internet environment fosters.

The Internet security software market consists of applications and tools in four submarkets: firewall software; encryption software; antivirus software; and authentication, authorization and administration software. There are also a number of emerging security submarkets such as virtual private networks (VPNs), intrusion detection, public key infrastructure and certificate authority (PKI/CA), and firewall appliances.

Network-based, intrusion detection systems are based on passive packet capture technology at a single point in the network. Such systems do not provide any information as to the source of the attack.

A firewall is a system for keeping a network secure. It can be implemented in a single router that filters out unwanted packets, or it may use a combination of technologies in routers and hosts. Firewalls are widely used to give users access to the Internet in a secure fashion as well as to separate a company's public Web server from its internal network. They are also used to keep internal network segments secure. For example, a research or accounting subnet might be vulnerable to snooping from within.

Following are the types of techniques used individually or in combination to provide firewall protection.

Packet Filter. Blocks traffic based on IP address and/or port numbers. Also known as a "screening router."

Proxy Server. Serves as a relay between two networks, breaking the connection between the two. Also typically caches Web pages.

Network Address Translation (NAT). Hides the IP addresses of client stations in an internal network by presenting one IP address to the outside world. Performs the translation back and forth.

Stateful Inspection. Tracks the transaction in an order to verify that the destination of an inbound packet matches the source of a previous outbound request. Generally can examine multiple layers of the protocol stack, including the data, if required, so blocking can be made at any layer or depth.

A denial of service attack is an assault on a network that floods it with so many additional service requests that regular traffic is either slowed or completely interrupted. Unlike a virus or worm, which can cause severe damage to databases, a denial of service attack interrupts service for some period.

An example includes a client fetching pages from an HTTP server for the sole purpose of utilizing the server's inbound or outbound bandwidth. Another example is a malicious client setting up streaming media connections for the purpose of exhausting a server's connections and bandwidth.

U.S. Pat. No. 5,231,593 to Notess discloses a system which keeps statistics for measurements in a LAN network. Moreover, it keeps its statistics in a compressed format to allow for scalability. Furthermore, this system uses promiscuous sniffing to measure LAN traffic.

U.S. Pat. No. 5,243,543 to Notess discloses a system which reports the promiscuous measurements of LAN traffic. It takes a set of remote LAN measurements and presents them in an interface.

U.S. Pat. No. 5,570,346 to Shur discloses a system which is focused entirely on measuring packet latency in a network.

U.S. Pat. No. 5,649,107 to Kim et al. discloses traffic statistics processing apparatus using memory to increase speed and capacity by storing partially manipulated data. The apparatus makes measurement statistics processing tractable by making intermediate transformations on the measured data.

U.S. Pat. No. 5,761,191 to VanDervort et al. discloses a system for statistics collection for ATM networks.

U.S. Pat. No. 6,061,331 to Conway et al. discloses a system which uses a combination of link utilization measurements in conjunction with a distributed statistics collection and a centralized linear programming engine to estimate the source and sink traffic characterization for a packet-switched network. The system attempts to infer a traffic matrix from measured data.

SUMMARY OF THE INVENTION

An object of the invention is to provide a method and system for profiling network flows at a measurement point within a computer network.

In carrying out the above object and other objects of the present invention, a method for profiling network flows at a measurement point within a computer network is provided. The method includes measuring network flows having invariant features at a measurement point located within routing infrastructure of the computer network to obtain flow statistics. The method further includes aggregating the flow statistics to obtain a traffic profile of the network flows at the measurement point.

The step of aggregating may be based on at least one of the invariant features.

The at least one invariant feature may be either a source endpoint or a destination endpoint and wherein the step of aggregating may be based on distance of the measurement point from the endpoint.

In terms of Internet metrics:

The level of route aggregation may be used as a measure of distance;

Physical and logical router interfaces may be used at the highest level of aggregation (most severe aggregation); and Logical distance may be used with respect to the forwarding topology (hop count).

The invariant features may include source and destination endpoints.

The method may further include identifying typical traffic source and destination pairs for network flows that transit the measurement point based on the source and destination endpoints.

The invariant features may include protocol type.

The invariant features may include port information.

The step of aggregating may be based on temporal, static network and dynamic routing parameters.

The method may further include identifying desired network flow characteristics based on dynamic routing and topology information.

The computer network may be the Internet.

In further carrying out the above object and other objects of the present invention, a system for profiling network flows at a measurement point within a computer network is provided. The system includes means for measuring network flows having invariant features at a measurement point located within routing infrastructure of the computer network to obtain flow statistics. The system further includes means for aggregating the flow statistics to obtain a traffic profile of the network flows at the measurement point.

The flow statistics are aggregated and may be based on at least one of the invariant features.

The at least one invariant feature may be either a source endpoint or a destination endpoint and wherein the flow statistics are aggregated based on distance of the measurement point from the endpoint.

The system further includes means for identifying typical traffic source and destination pairs for network flows that transit the measurement point based on the source and destination endpoints.

The flow statistics are aggregated and may be based on temporal, static network and dynamic routing parameters.

The system may further include means for identifying desired network flow characteristics based on dynamic routing and topology information.

The system may have the ability to adapt to system resources in a dynamic fashion by reassignment of system resources to deal with possible aggregation levels.

In general, the method and system of the invention uses fine-grained information from the forwarding infrastructure that is aggregated in a hierarchical manner to infer an aggregate traffic matrix at distinct points in the network. The method and system works in a distributed manner, but could be correlated in a centralized algorithm that splits the aggregation and infers the fine-grained (host-to-host) traffic matrix.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic view of a denial of service scrubber (DoS scrubber) positioned to protect publicly accessible network computer services such as an Internet service;

FIG. 2 is a schematic view of the DoS scrubber architecture;

FIG. 3a is a schematic view illustrating single link flow measurements as a type of flow statistic extraction;

FIG. 3b is a schematic view illustrating switching point measurements as a type of flow statistic extraction;

FIG. 15 is a schematic view illustrating blocking DoS traffic.

DETAILED DESCRIPTION OF THE PREFERRED EMBODIMENTS

Figure 4:
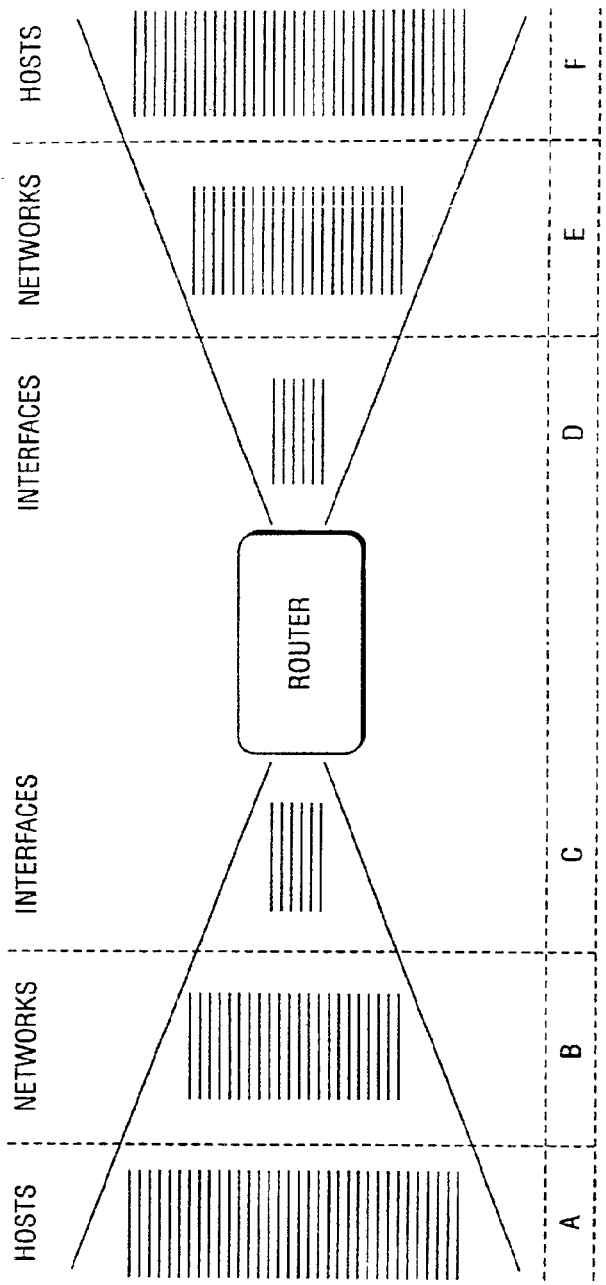
FIG. 4 is a schematic view illustrating a cross-product space for a hierarchical network profiler with incoming flows on the left and outgoing flows on the right.

In general, the present invention provides a method and system for protecting publicly accessible network computer services from undesirable network traffic in real-time and is useful within a larger system which combats denial of service attacks without requiring any changes to the existing Internet routing infrastructure. This larger system, in general, combines network topology information and coarse-grained traffic statistics from routers to detect, backtrack, and filter distributed attacks on enterprise networks and websites. This larger system exploits information from routers without requiring any changes to the existing Internet routing infrastructure. The larger system as well as the present invention works with the existing routing infrastructure deployed at Internet service providers, application service providers, and enterprise networks. The method and system is enabled by functionality that the major routing vendors have put into their latest products.

The larger system includes a number of complementary components as follows:

StormProfiler. A set of data mining and network profiling techniques that are used to define "normal" traffic patterns and set dynamic thresholds that are continually monitored for early detection and notification.

StormDetector. A new process for real-time monitoring, detection, and notification of denial of service attacks and network anomalies. Continuous or periodic sampling is employed for collecting network statistics and extracting network topology information from routers.

StormTracker. A new protocol for correlating anomalous distributed events that enables tracking a denial of service attack back to its source.

StormBreaker. A unique solution for protecting and minimizing the impact of denial of service attacks on websites and Web hosting services. This solution is based on the unique protocol scrubber technology.

DoS Scrubber

In general, the method and system of the invention use Internet routing data in conjunction with passive traffic data to identify application-level denial of service attacks. An example includes a client fetching pages from an HTTP server for the sole purpose of utilizing the server's inbound or outbound bandwidth. Another example is a malicious client setting up streaming media connections for the purpose of exhausting a server's connections and bandwidth.

In the invention, a server's request stream—such as a web server's web logs—are monitored to build a profile of requests from a topologically clustered set of machines in the Internet. These clusters are identified by their administrative domain. These administrative domains are inferred by examining the Internet's BGP routing tables from several points in the Internet. By generating the server's request profiles for sets of clusters in the Internet, malicious hosts that are launching application-level denial of service attacks can be detected. While this clustering technique has been used in the past for identifying appropriate web caches for minimizing web fetch latency, they have not been applied to detecting denial of service attacks.

Once these malicious hosts are identified, their requests can be filtered either at the server or upstream in the network.

A denial of service scrubber (DoS scrubber) is an actively interposed network element or system that removes denial of service attacks from legitimate network traffic in real-time. The denial of service scrubber removes a new type of denial of service traffic from publicly accessible Internet services.

In particular, the DoS scrubber removes denial of service attacks on publicly accessible Internet service. Moreover, it uses data mining techniques to remove a class of previously unidentifiable denial of service attacks. This new class of attacks appear to the service as legitimate service requests; however, these requests are generated by a malicious agent with the sole purpose of denying resources to servicing legitimate requests.

FIG. 1 shows an example use of the DoS scrubber. It depicts a network server providing a publicly accessible service—a public Web server for example. The DoS scrubber is interposed between the server and the Internet. As such, it sees all the traffic that passes between the server and its remote clients. As a public server, both legitimate and malicious users gave equal access to its resources. However, by analyzing the service request distributions and packet statistics, the DoS scrubber can identify malicious users of the service and either filter completely or throttle back their access.

Protecting Web (Hypertext Transfer Protocol, or HTTP) services is one specific application of the DoS scrubber. When scrubbing HTTP traffic, the DoS scrubber separates legitimate from malicious Web requests. The scrubber leverages the fact that HTTP is layered on top of the TCP transport protocol. Because TCP sessions cannot be spoofed—that is the source address cannot be forged, due to shared random initial sequence numbers—the client-end of service requests are clearly and uniquely identified. By pairing a client's unique identity—its IP source address—with its connection statistics and request distribution, a profile can be constructed through data mining. This profile can be compared to the normal profile that is obtained through data mining techniques by the scrubber during a training session. This training can also be updated on-line as the system runs. Clients with profiles that are flagged as anomalous are then candidates for their subsequent requests to be attenuated or completely filtered.

FIG. 2 denotes the denial of service scrubber's high-level architecture. It is comprised of two primary components: the forwarding and the analysis engines. The forwarding engine (FE) has two main responsibilities: applying filtering and rate limiting to sets of Internet hosts, and generating request statistics. The analysis engine (AE) is responsible for the collection and subsequent data mining of the forwarding engine's statistics. Upon detection of malicious hosts, appropriate actions are fed back from the analysis engine to the forwarding engine for filtering or rate limiting the host's requests.

The DoS scrubber's forwarding engine serves both as an enforcement mechanism and statistics generator. When Internet Protocol (IP) packets enter the scrubber, they are given to the forwarding engine. Upon receipt, the FE determines if the packets belong to an old request, or are part of a new request. If the request is new, a variety of safeguards remove many of the common types of denial of service—such as TCP SYN floods. However, the safeguards also include checking to see if requesting client has been determined malicious by the analysis engine. If so, the request is dealt with in a policy configured manner. For example, if the service is not overwhelmed, it may allow the request to happen; however it can be throttled back using a custom rate limiter. When packets arrive that are not discarded, statistics are collected that are later sent to the analysis engine. Examples of these statistics include:

Size: the request and subsequent reply's size, both in bytes and packets.

Request payload: content of the request at the application layer (e.g., HTTP GET string).

Number of fragments: the number of fragments in the request can be used to detect some types of malicious use.

Number of protocol anomalies: the number of errors in the request's protocols.

The analysis engine uses the stream of request statistics as a feed into a data mining system. The system compares the various client request statistics to sets of profiles. There are two sets of profiles: canned and trained profiles. The canned profiles represent anomalous behavior at the service level. These canned profiles can be changed through a control interface to match an administrator's specifications. The trained profiles are generated by training on the server's genuine request statistics. Sophisticated denial of service attacks that were previously unidentifiable can be detected by comparing a client's request distribution to those of the profiles.

The system differs from firewalls in that it protects publicly accessible services from attack. The system recognizes attacks on edge services and adapts the forwarding rules to remove them from the network. Statistics and data from service requests are sent from the forwarding engine to the analysis engine. These data are then analyzed using data mining techniques to find malicious or anomalous service request patterns. The analysis engine then feeds this information back into the forwarding engine to filter or attenuate access to the public service from these inappropriate sites.

Unlike firewalls, the scrubber does not proxy the connections or authenticate access to a service; it forwards statistics from a series of client service requests to be analyzed for attack behavior.

Hierarchical Network Profiler (HNP) or StormProfiler

In general, the hierarchical network profiler (HNP) is a new approach to network traffic profiling. It aggregates network statistics using a novel cross-product of hosts, network and router interfaces to profile network traffic at a measurement point.

In particular, the hierarchical network profiler (HNP) represents a quantum leap forward in the area of network traffic profiling. This technology identifies gross bandwidth anomalies automatically at any point in a network's routing infrastructure.

The goal of network profiling is to construct a model of network traffic. The approach the HNP takes is to model the network at the granularity of network flows. A network flow is defined as "a unidirectional sequence of packets that are collocated within time that have invariant feature across all the packets." These features may include the source and destination addresses, a protocol type, and any application layer port information. An example of an Internet flow is a sequence of packets that all have the same IP source and destination addresses, IP protocol value, and UDP or TCP source and destination ports.

FIGS. 3a and 3b show two ways to measure flow statistics in a networking environment: at a single networking link of FIG. 3a, and at a multi-link switching point of FIG. 3b. In the single link case, a measurement device sits on a single networking link and constructs flow statistics for the underlying network traffic. Switchpoint statistics generally require measurement support in the hardware, such as Cisco System's Netflow technology, or Juniper Network's Internet Processor II's packet sampling technology and Cflowd. This hardware support typically provides the standard flow invariants described above in addition to information about the incoming and possibly outgoing interfaces. The HNP can profile the traffic flows gathered in either of these manners.

The HNP automatically adjusts to its position in the network by identifying the typical traffic source and destination pairs for flows that transit the measurement point—e.g., router. The diagram in FIG. 4 illustrates the possibilities for cross-products of incoming and outgoing endpoints for transit flows. The most specific endpoint—at the lowest aggregation level—is a host's IP address. When hosts are aggregated into network blocks—such as CIDR blocks—fewer endpoint statistics are required. These are represented by the middle block of endpoints in FIG. 4. Finally, the router's interfaces are the highest level of aggregation—and the least specific. The HNP adjusts the amount of aggregation that it keeps on each interface depending on the level of diversity the flow endpoints exhibit along that interface. This diversity is directly proportional to the distance from the measurement interface to the endpoints. For example, a router close to a set of enterprise hosts will be able to maintain flow statistics about each host—a host corresponds to a flow's endpoint when their number will not be prohibitive. However, in this example, the other endpoint of the flow may be very far from this router. Therefore, the HNP may only keep a profile of its measurement interface. This example illustrates the general application of the HNP: the HNP keeps a profile for the cross-product of the flows that traverse it. In this example, it may keep the cross product A×D for flows destined for the Internet from this set of hosts.

Figure 5:
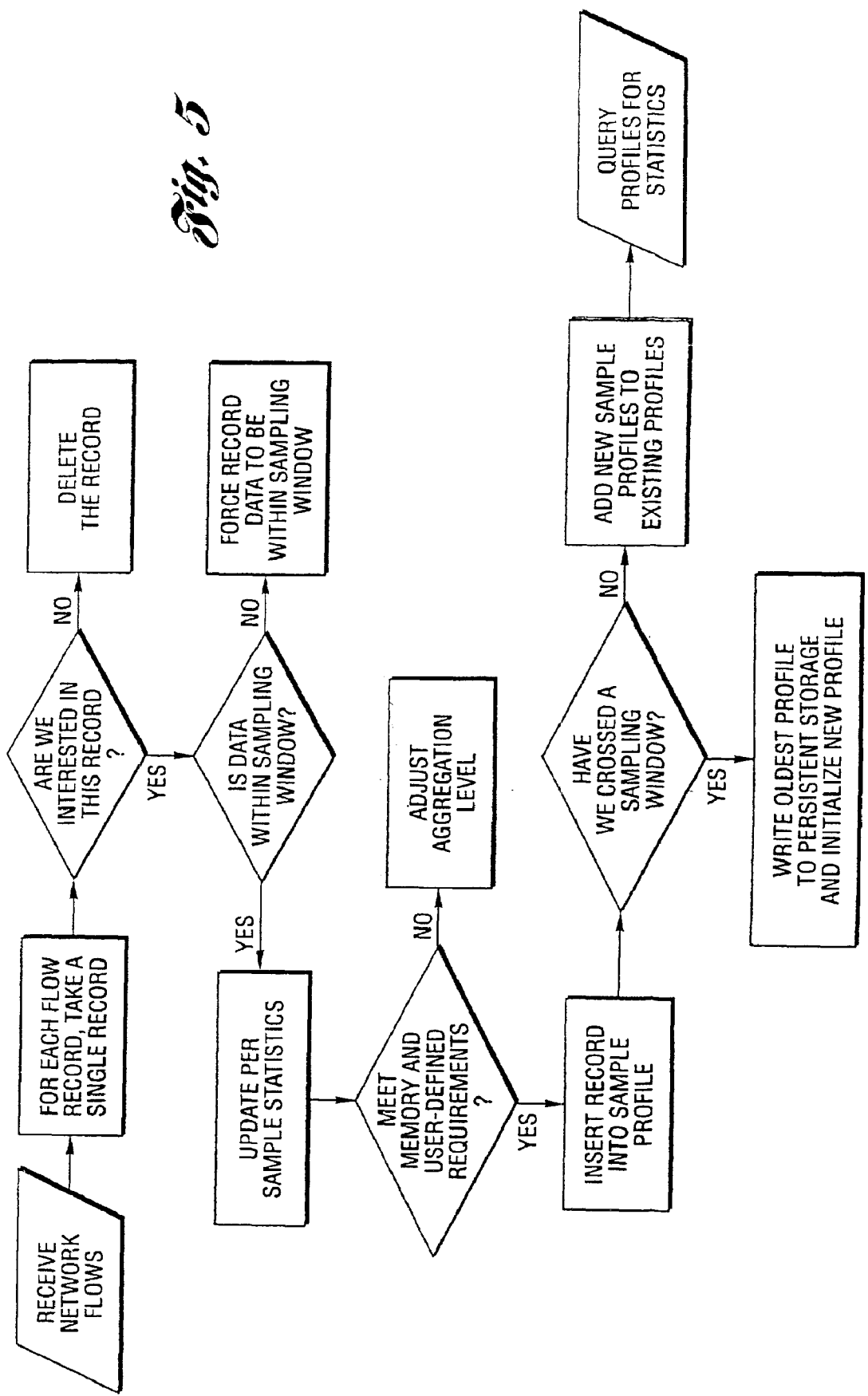
FIG. 5 is a schematic block diagram flow chart which provides an operational description of the hierarchical network profiler.

FIG. 5 represents the algorithm for the Hierarchical Network Profiler (HNP). At the beginning of the process iteration, the HNP receives network flow statistics from the network-forwarding infrastructure. These statistics represent summaries of network traffic that the HNP uses to build its profile. After receiving a set of flow summaries (or records), the HNP iterates over each specific flow record. It determines if it is interested in the record; that is, a profile is maintained for either the flow's source or destination aggregate. If not, the HNP updates the source and destination profile with the flow's statistics.

The HNP then checks to see if the memory and user-defined requirements continue to be met. If not, the aggregation level for the profiles is adjusted so that the requirements are met. When the aggregation level is met, the HNP inserts the statistics into the sample profile. The system then checks to see if a sampling window has been crossed. When this occurs, the HNP writes the oldest profile to persistent storage, and initializes a new profile. If the sampling window has not been crossed, the new samples are added to the existing profiles. After the iteration over the flow statistics has completed, the system then goes back to query for further flow statistics, and begins the process over again.

The HNP takes many available parameters into consideration when constructing a traffic profile based on temporal parameters, static network parameters, and dynamic routing parameters. Temporal parameters are important to discern important differences in traffic behavior. The most important temporal properties are: time of day, day of the week, day of the month, and holidays. Additionally, the HNP uses static network parameters to gauge the importance of downstream hosts and networks for aggregation purposes. Similarly, dynamic routing information can be used as an input parameter to the HNP. Together dynamic routing and topology information form a powerful mechanism for identifying salient network flow characteristics.

The following list describes several applications of the HNP:

1. Detecting Denial of Service Attacks: The HNP is very good at detecting gross anomalies in network behavior between network endpoints. These types of anomalies are the exact signatures left in the wake of denial of service attacks. As such, the HNP provides a basis for detecting denial of service attacks.
2. Traffic Characterization: The HNP can be used for capacity planning and traffic characterization.
3. Configuration Management: Bugs in network configurations often manifest themselves as a change in the network's end-to-end behavior. The HNP can easily detect these types of configuration problems.

The Hierarchical Network Profile (HNP) differs from past attempts to profile network traffic in two ways. First, is uses the network flow statistics available both from the routing infrastructure and single link measurement infrastructure. Second, it profiles network traffic in proportion to its distance from either the source or destination. HNP can profile the network with more accuracy than traditional approaches by leveraging flow statistics collected directly at the router. The second innovation in the HNP is its notion of hierarchy—or distance from a packet's source or destination—when constructing a profile. The HNP constructs traffic profiles differently, depending on where the measurements are collected. Specifically, it keeps track of more information about the flows, the closer the measurements are collected to the underlying flows' endpoints. This novel approach to profiling allows the HNP to generate useful network profiles at any point in the Internet.

As previously mentioned, StormProfiler represents a quantum leap forward in the area of network traffic profiling. This technology allows network provider and enterprise managers to identify gross bandwidth anomalies automatically at any point in their routing infrastructure. Not coincidentally, these types of anomalies are the exact signatures left in the wake of denial of service attacks. The StormProfiler differs from past attempts to profile network traffic in two ways. First, it uses the network flow statistics available from the routing infrastructure. Second, it profiles network traffic at a router in proportion to its distance from either the source or destination.

StormProfiler can profile the network with more accuracy than traditional approaches by leveraging flow statistics collected directly at the router. Past profiling attempts have focused on placing passive measurement devices at points in the network. These only allow for measuring the traffic on a specific link between two routers. In contrast, by profiling directly at the routers, StormProfiler can determine how specific traffic is typically routed. An analogy would be hiring someone to sit by the side of a road and count how many cars are going in one direction—this is the old approach to profiling. In the. same analogy, the StormProfiler sits instead at an intersection, and can tell you how many cars from each direction went down which fork. Clearly, you know much more about your traffic patterns from studying the behavior at the intersection (the router). In this manner, the StormProfiler builds a model over time of how much traffic is routed from one point to another at a specific Internet intersection. This profile has several uses: the foremost for our purpose is denial of service detection.

The second innovation in the StormProfiler is its notion of hierarchy—or distance from a packet's source or destination—when construction a profile. The StormProfiler constructs traffic profiles differently, depending on where the router is in the network. Specifically, it keeps track of more information about the flows, the closer the router is to the source (or destination) it is. This novel approach to profiling allows StormProfiler to scale to any point in the Internet.

StormTracker and StormBreaker

In general, the denial of service detector and tracker is a system that detects and backtraces Internet denial of service attacks using packet and flow statistics gathered directly from the Internet routing and forwarding infrastructure.

In particular, the denial of service tracker (DoS tracker) is a system that detects, backtraces and blocks Internet denial of service attacks. It works by gathering packet and flow statistics directly from the Internet routing and forwarding infrastructure—hereafter called the forwarding infrastructure. By collecting flow statistics directly from the forwarding infrastructure, the DoS tracker is able to trace DoS attacks that are untraceable by prior art. Specifically, the DoS tracker can pinpoint the origin of Internet denial of service attacks that are launched with forged source addresses.

Figure 6:
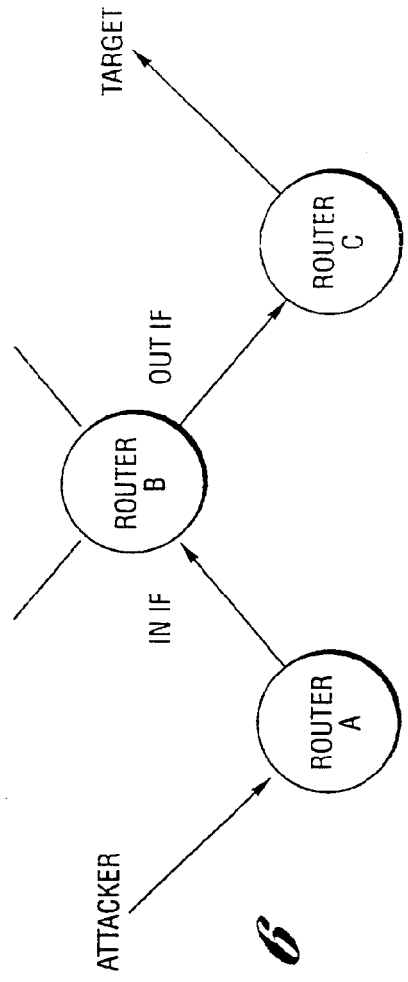
FIG. 6 is a schematic view illustrating an example use of a denial of service tracker.

The DoS tracker specifically tracks flood-based denial of service attacks. These types of attacks attempt to overwhelm either network or end-host resources by generating a stream of packets either directly or indirectly destined for a target. FIG. 6 shows an example denial of service attack that can be tracked through a sample network. The path of the attack traffic goes through Router-A, Router-B, and Router-C. The most insidious types of attacks hide their origin by forging the source Internet Protocol (IP) address on the attack packets. The problem this causes for administrators and security officers is that when the target discovers itself under attack, it cannot determine its origin; therefore making it impossible to shut the attack down. Our key observation is that we can take statistics directly from the forwarding infrastructure itself to determine the path and origin of the attack traffic—even when it is forged. For example, on some types of forwarding infrastructure—such as Cisco and Juniper routers—one can interface directly with the infrastructure to find out which interfaces are affected by an attack. In the example of FIG. 6, the inbound and outbound interfaces that the attack travels across can be ascertained. When pairing this information with knowledge of the physical and logical topology, it is possible to trace the attack through the network to its source.

Figure 7:
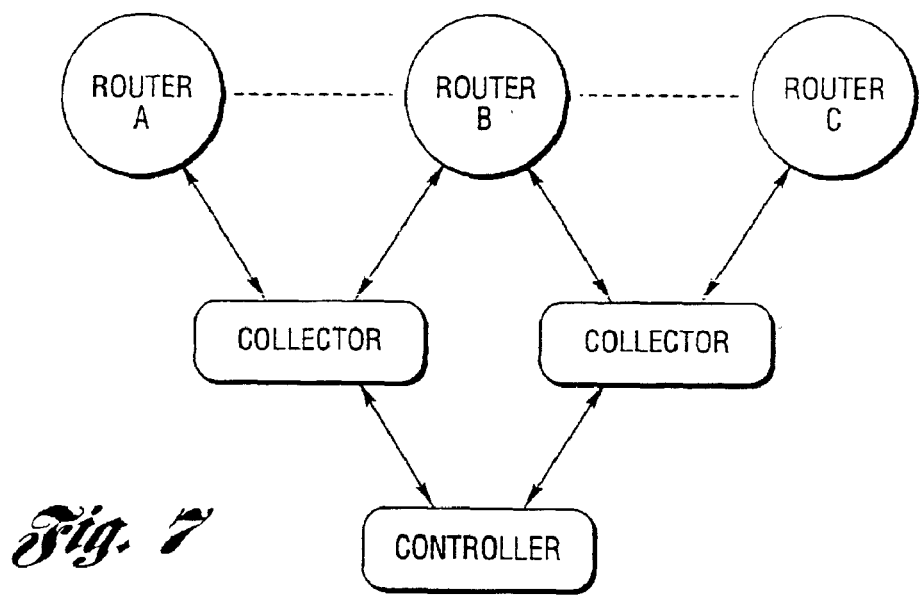
FIG. 7 is a schematic view of the architecture of a denial of service tracker.

FIG. 7 illustrates the DoS tracker's overall architecture. It is comprised of a two-stage hierarchy: collectors and controllers. The collectors interface with the forwarding infrastructure; they collect the statistics and report those findings to the controllers. The controllers analyze the statistics, looking for denial of service attacks and tracking them to their source.

The DoS tracker's collector takes samples of statistics from the forwarding infrastructure. The DoS tracker utilizes two types of statistics that routers may collect on our behalf: single packet statistics, and flow-based statistics. Single packet statistics are those that provide essential information about a set of packets entering a forwarding node—a router. Some of the statistics kept include: destination and source IP addresses, incoming interface, protocol, ports, and length. After collection, these single packet statistics can be collected from the router for analysis. Juniper Network's packet sampling technology is an example of single packet statistic support in the infrastructure. Flow-based statistics are statistics that describe a set of packets that are related to the same logical traffic flow. The concept of flow is generally defined as a stream of packets that all have the same characteristics: source address, destination address, protocol type, source port, and destination port. They may be either unidirectional or bidirectional. Flow statistics aggregate a flow's individual packet statistics into a single statistic. Examples include a flow's duration, number of packets, mean bytes per packet, etc. Cisco System's Netflow and Juniper Network's Cflowd mechanism are widely deployed flow-based statistic packages.

Once the controller has received the statistics from the collector, it takes one of two approaches to trace the DoS attacks: directed tracing and distribution correlation. In directed tracing, one utilizes the knowledge of network topology to work backward toward the source of the attack. With distributed correlation, the controller compares the attack signature with those discovered at other nodes in the topology. Attacks that correlate strongly are associated together and implicitly form the path from the source to the target. Directed tracing relies on the fact that one has both the router's incoming interface statistic for an attack and the knowledge of the topology to determine what routers are upstream on that link. With this knowledge, upstream routers can then be queried for their participation in transiting the attack. It is useful to note that since these upstream routers are looking for a specific attack signature, it is much easier to find the statistics of merit. This contrasts with the distributed correlation approach where a general attack profile is extracted from every router's statistics to uncover the global path for the attack.

After detection and tracing, the DoS tracker blocks denial of service attacks as close to their source as possible. By taking a global view of the Internet—across service providers and network—DoS tracker is able to coordinate both the routing infrastructure's ability to filter certain types of traffic in conjunction with custom filtering hardware that can be incrementally deployed in the network. For example, Juniper's Internet Processor II and Cisco's ACL CAR can be utilized to download coarse-grained filters that will remove unwanted DoS attacks in real-time. Furthermore, the DoS blocker can be used as a way to filter at a fine-grain at high speeds in any networking environment, regardless of the routing infrastructure's implementation. As a custom hardware solution to blocking DoS attacks, the DoS blocker is simply a configurable network filter. The blocker, due to its simplicity of design, is very scalable.

The DoS Tracker approach differs from conventional network-based intrusion detection (NID) in that it uses statistics from the networking infrastructure itself in contrast to prior art. Prior art in NiD systems uses passive measurement techniques at a single point in the network to acquire statistics. These point probes don't provide any information about the source of a forged attack and are therefore useless for tracing denial of service attacks back to their source. Moreover, NID systems are single point measurement systems that have very little support for multi-node measurement correlation or cooperation and are unable to scale to service provider networks.

Cisco System's Netflow flow statistics have not been used for tracking network attacks. They have only been used for access control and traffic billing. Moreover, we have automated a way of polling the Netflow cache in contrast to the continuous mode of Netflow operation used by most products.

Juniper's packet sampling technology and Cflowd mechanism have not been used for tracing attacks.

Another novel feature of the present approach is the filtering of denial of service attacks upstream in the Internet. Current practice is for a target of an attack to stop DoS attacks at their firewall or border router. The present invention differs in that it communicates with the networks and routers along the path back toward the attacker. When this path is identified, the system can filter the attack as close to its source as possible.

As previously mentioned, the distributed approach to global DoS attack detection is based on a notion of both hierarchical and neighboring zones. The philosophy behind this approach lies in the following observation: every detection/traceback node cannot know about all of the outgoing attacks in the Internet; instead, these points should only know about the attacks that are occurring in their neighborhood. To handle very large scale—Internet wide—DoS detection and traceback, the approach utilizes the natural hierarchy of the Internet addressing scheme. Specifically, the Internet is broken down into manageable portions called zones. These zones then communicate with their neighbors, sharing both specific and aggregated attack signatures and traceback information. The Internet scales because of hierarchy in addressing and routing. Routers and end hosts could not route packets if they had to know about all of the endpoints or routes. By aggregating this information through hierarchy, the Internet is possible. The same approach was taken when designing the algorithm for coordinating global denial of service detection and traceback.

Figure 8:
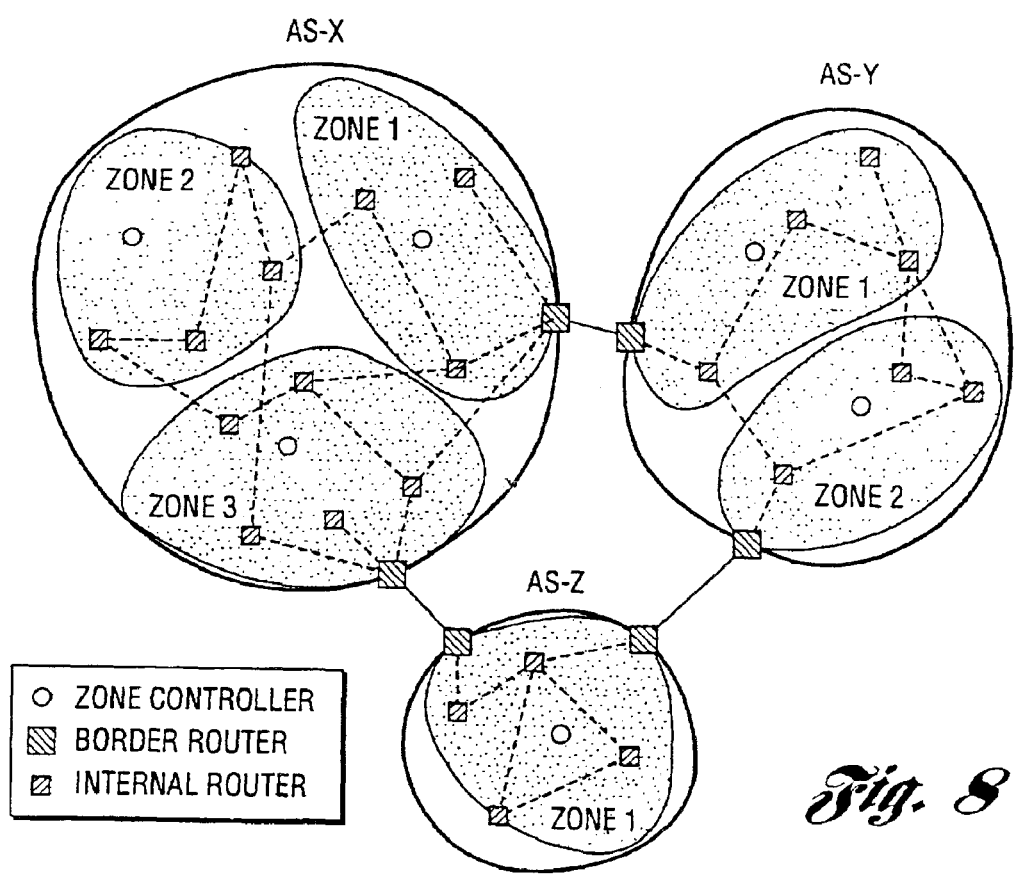
FIG. 8 is a schematic view of distributed architecture for global detection and trace back of denial of service attacks.

FIG. 8 provides a graphical overview of how a portion of the Internet—consisting, in this example, of three Autonomous Systems (ASes)—could be organized. The figure shows how the size of the autonomous system can be accommodated by increasing the corresponding number of zones. There are two types of zones: base zones and aggregate zones. A base zone is a zone that consists purely of a set of routers. These routers all reside within the same AS. The local detection and tracing system described above corresponds to the detection and tracing system for a base zone. Higher level zones, or aggregate zones, can be constructed from sets of base and other aggregate zones. In general, a single zone will not span multiple autonomous systems, but this is not strict.

The zones communicate with each other in a decentralized, distributed manner using the Anomaly Description Protocol (ADP), similar to the way global routing peers communicate using the Border Gateway Protocol. The global zone topology is constructed in three ways: local-AS configuration, peer-AS configuration, and remote-AS configuration. Zones within an autonomous system are configured—a local-AS configuration—to communicate with each other. Since they reside within the same administrative entity, their neighbor parameters can be set specifically. When crossing autonomous systems between AS peers, neighboring zones can also be set according to policy and topology constraints—a peer-AS configuration. When connecting zones to a non-ADP enabled AS, a resource discovery algorithm is used to determine the closest neighboring zones through the chain of non-participating peering ASes.

The zones operate autonomously, and share information about both local and remote attacks using the Anomaly Description Protocol. When attacks are detected locally, a zone will propagate the attack to its neighbors using the ADP. This propagation includes the attack's signature which can be used for both detection and blocking. When a zone receives an ADP message from one of its neighbors, it adds this attack to those the local zone looks for. It is then further propagated to other neighboring zones when it is detected locally. ADP messages are therefore constrained to their appropriate portion of the Internet, allowing for scalability. Moreover, when passing attack information to neighbors, the ADP attempts to aggregate attack information so that multiple attacks that are described with the same aggregate profile, resulting in a single ADP entry.

The StormDetector is a mechanism for identifying denial of service attacks within an ISP, a Web hosting service, or an enterprise network. It combines a network's dynamic profile—generated by the StormProfiler described hereinbelow—with internal static signatures of denial of service attacks to instantly identify malicious traffic. This technology utilizes custom algorithms to identify denial of service attacks in the reams of incoming traffic flow statistics gathered from the routing infrastructure.

Figure 10:
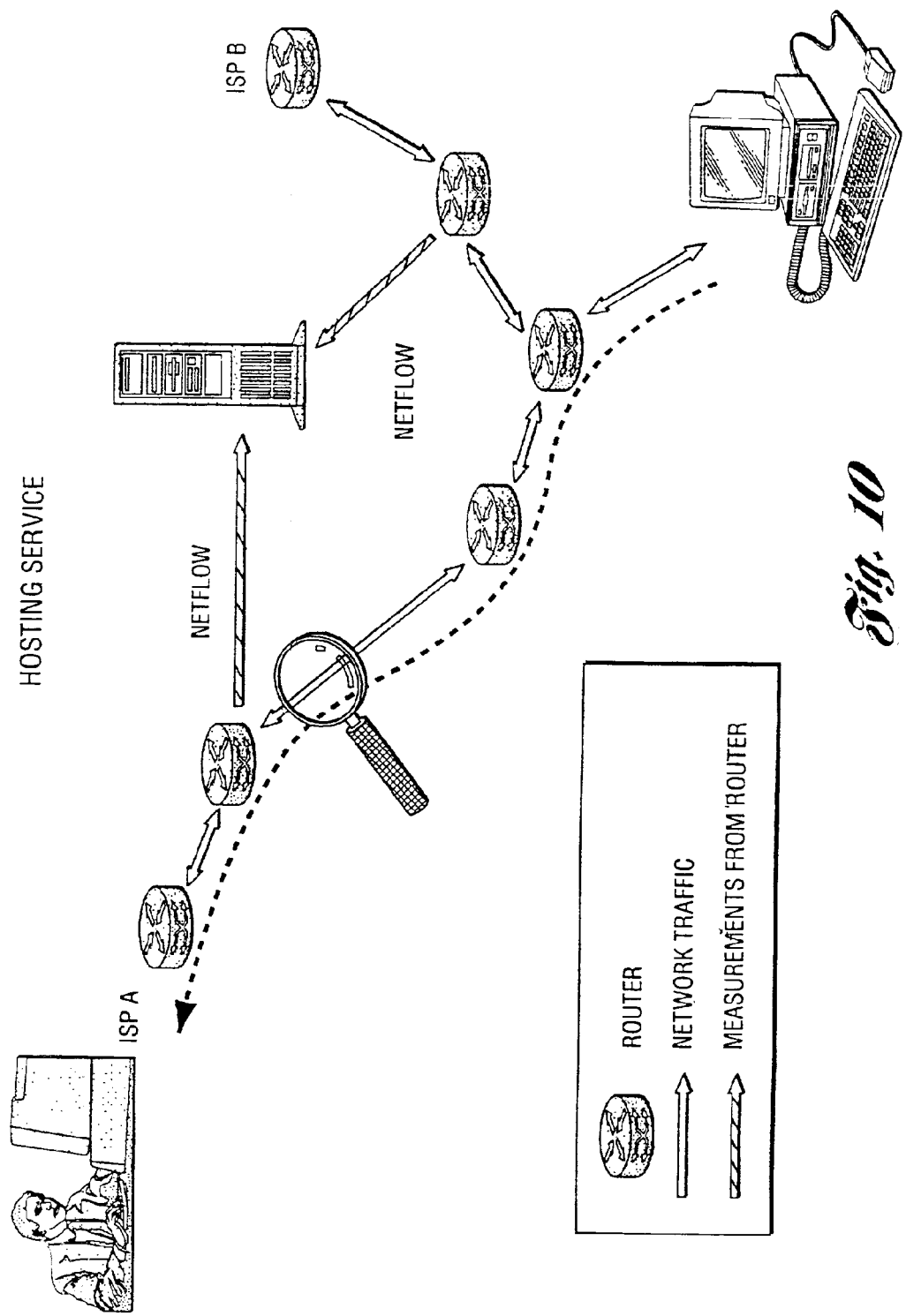
FIG. 10 is a schematic view illustrating back-tracking a forged packet source.

FIG. 10 demonstrates the utility of the StormDetector system. A host in ISP-A is bombarding a target server in the Web hosting service with a denial of service attack. However, the attacker is forging the return address on the packets in the attack, making is impossible to determine their true origin. The StormDetector's analysis engine receives flow statistics from the routers in the target's hosting service. From these statistics, it can detect the attack at some set of the affected routers along its path. This path leads directly from the target to ISP-A's border, where the attack originates. This example demonstrates the utility of the StormDetector deployed within a Web hosting service's network. It can also be used in both source and transit networks.

When employed at an attacker's originating network, StormDetector can pinpoint the location of the attacker. In this case, it will backtrack the attack directly to its source's first-hop router. It may be that the attacker is a zombie residing on a compromised machine in an enterprise network. In addition to uncovering those traditional launchpads, StormDetector will be instrumental in identifying attacks originating from home machines that connect to the Internet through persistent tier-2 ISP's ADSL or cable modem connections.

Figure 9:
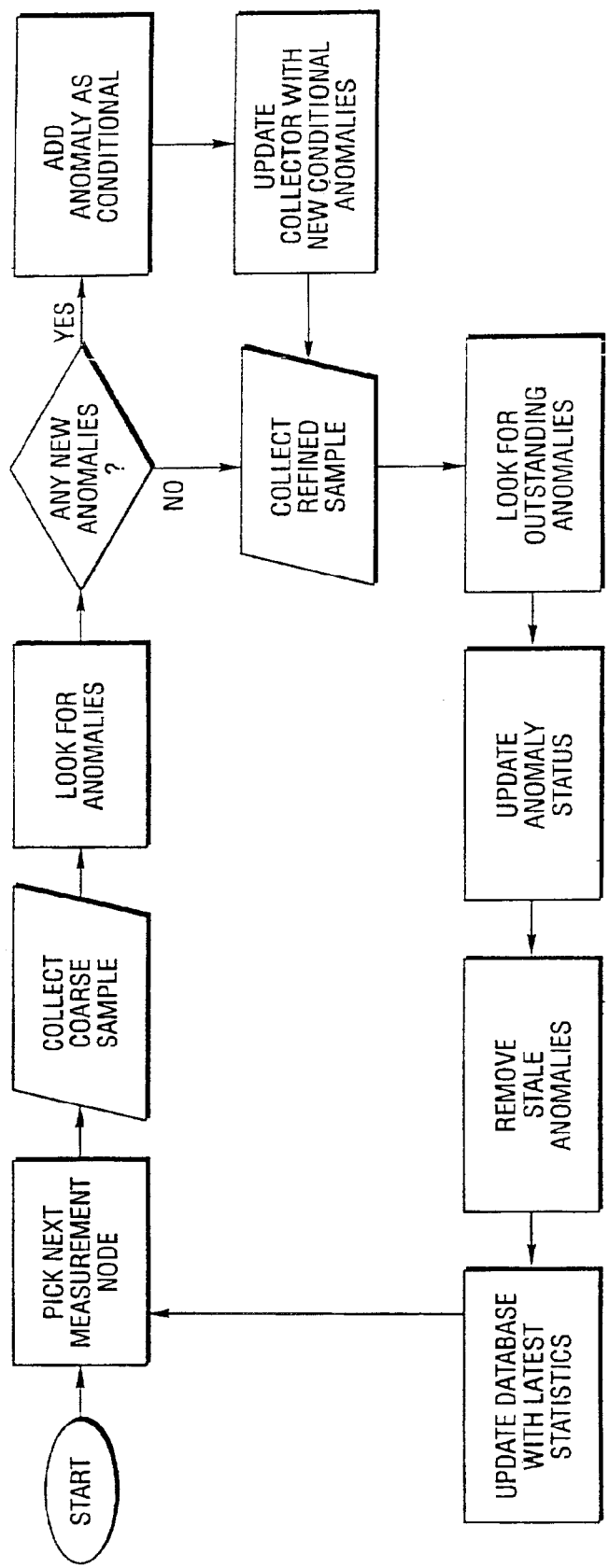
FIG. 9 is a schematic block diagram flow chart illustrating an intra-zone denial of service anomaly detector.

FIG. 9 represents the process for detecting anomalies in the network statistics within a single zone. At the start, the system picks a measurement node at random. A set of coarse flow statistics or packet header samples is collected. This set of statistics is examined for anomalies. These anomalies include both clearly defined misuse of the network resources, and also significant differences between the profile of the various endpoints and the behavior measured in the sample. If any new anomalies are detected in the sample, they are added as conditional anomalies, and the collector is updated with these new conditional anomalies. Next, a refined sample is taken with respect to the pending conditional anomalies at the collector. The system then looks at the refined sample of the network statistics for the presence of both new conditional anomalies as well as old anomalies. For each anomaly found, its status is updated. The system then goes through the outstanding anomalies and prunes out any stale ones. Finally, the system updates the database with the latest summary statistics for each of the outstanding anomalies. The system then repeats, by beginning at the start node.

As previously mentioned, StormTracker includes a set of algorithms that provide the functionality for tracking anonymous denial of service attacks to their sources. These algorithms provide two main functions: directed searching and path reconstruction. Directed searching is an algorithm for quickly separating the attack traffic from the legitimate network traffic—essentially quickly finding needles in haystacks. By narrowing the scope of the upstream detection points, directed search provides the means for scalable tracking of large-scale attacks. Path reconstruction takes multiple measurements of distributed denial of service attacks and determines their global topology characteristics. Specifically, given a huge distributed denial of service attack, StormTracker allows many statistics collected from around the Internet to be quickly and robustly correlated to reconstruct the attack tree.

The StormTracker protocol binds these distributed detection points together. This protocol allows multiple autonomous StormDetectors to cooperate and exchange attack information, enabling a globally scoped solution. StormTracker needed a clear definition of denial of service attacks in order to communicate effectively. The StormTracker protocol codifies this definition as a standard for exchanging attack information between multiple Storm-Detector networks.

Figure 11:
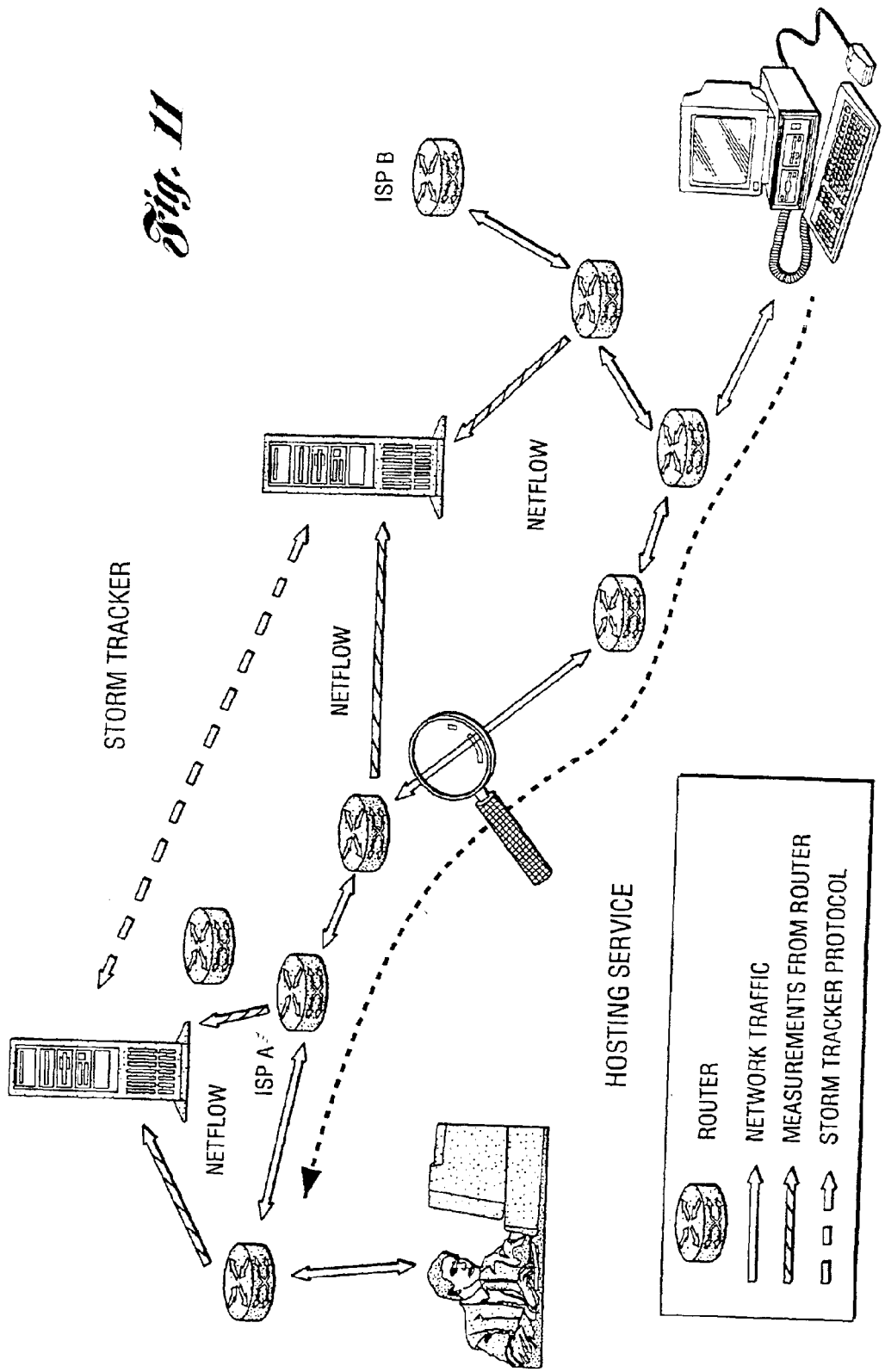
FIG. 11 is a schematic view illustrating a storm tracker which backtracks an attack to its source.

FIG. 11 shows an example of how two systems with StormDetectors can cooperate using the StormTracker protocol to trace the attack to its origin.

StormBreaker is another piece of the solution to denial of service attacks: stopping the attack. Specifically, once StormDetector and StormTracker trace an attack to its origin, the network uses StormBreaker to filter its effects. It protects the target by both guaranteeing it fill connectivity to the Internet as well as ensuring its ability to provide legitimate clients with service. The StormBreaker technology works with both standard network infrastructure and custom filtering technology. Specifically, it can use the filtering abilities of both Cisco and Juniper routers for removal denial of service attacks. In addition to standard networking solutions, a custom filtering appliance has been developed that will remove attacks from an interposed link at high-speed line rates. This custom solution is based on the Intel IXP network processor.

Figure 12:
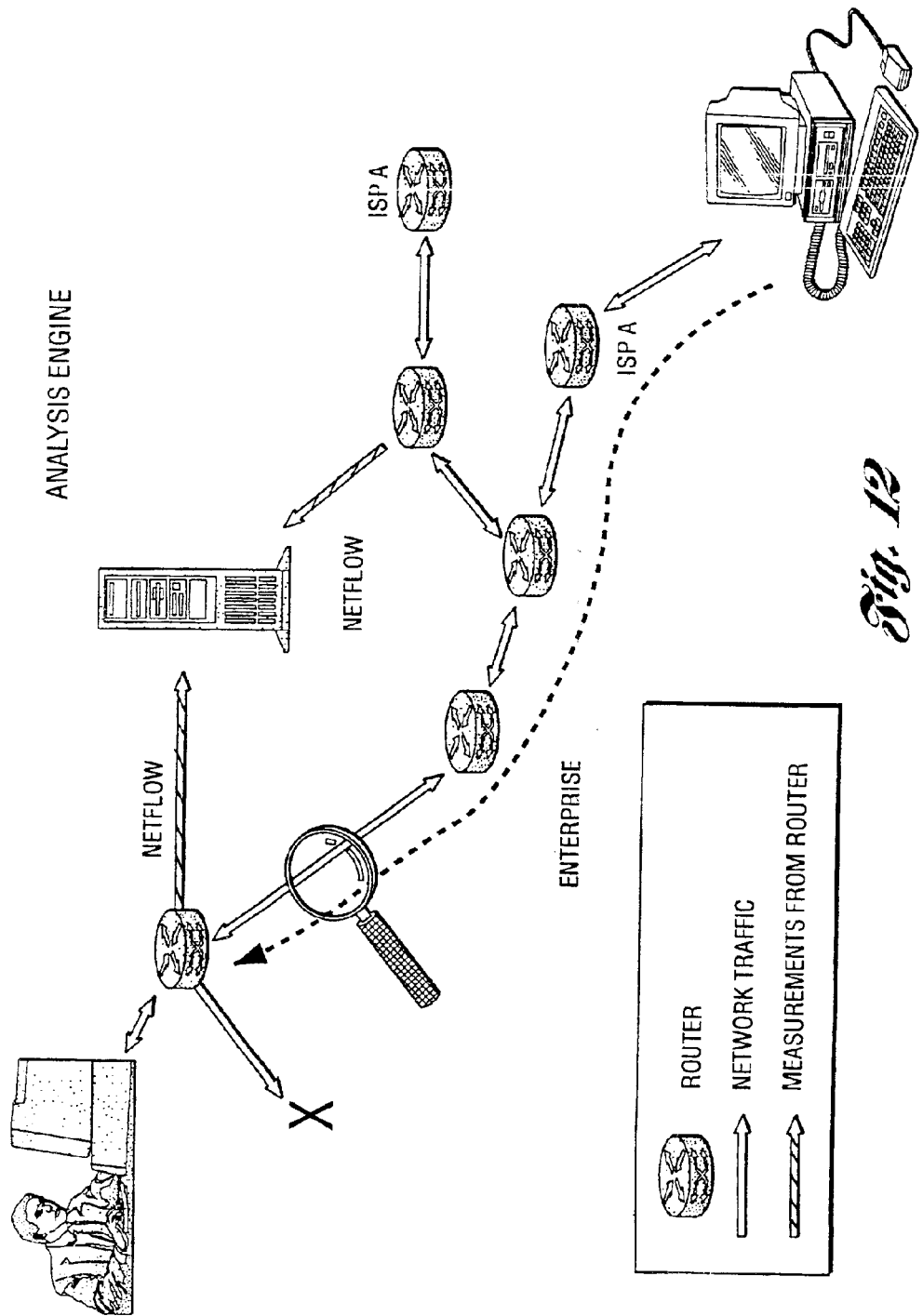
FIG. 12 is a schematic view illustrating storm breaker blocking an attack.

The example in FIG. 12 shows the use of StormBreaker to block a denial of service attack at its source. The attack has comprised a machine in the enterprise network and has been attacking a host downstream in ISP-B. Once the attack has been detected and tracked to its origin, StormBreaker determines the appropriate filtering response. Specifically, StormBreaker uses knowledge about the topology and infrastructure components in a network to make the best filtering decision. In this example, StormBreaker applies a filtering rule to the attacker's router to remove its traffic from the network.

Figure 13:
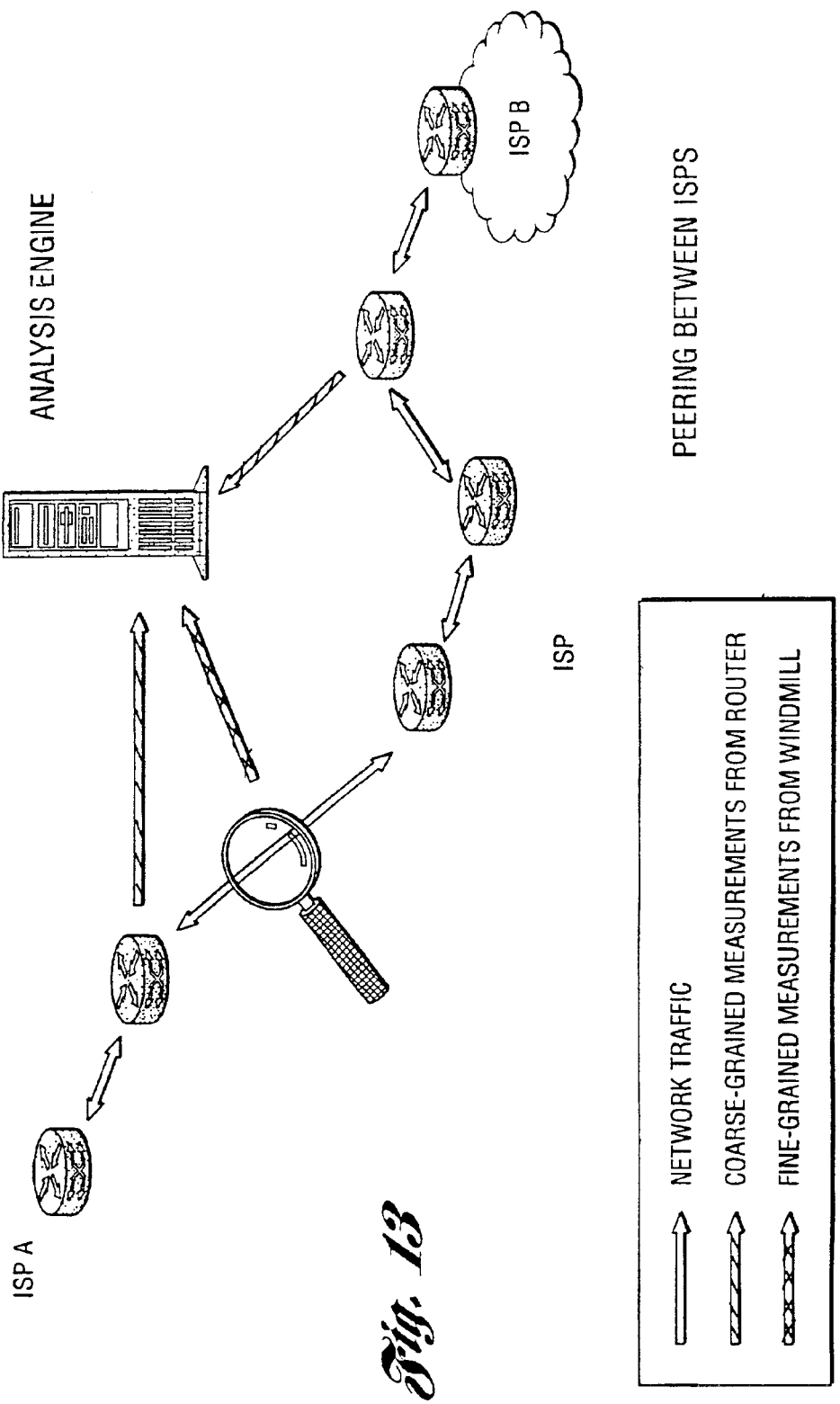
FIG. 13 is a schematic view illustrating attack and anomaly detection.
Figure 14:
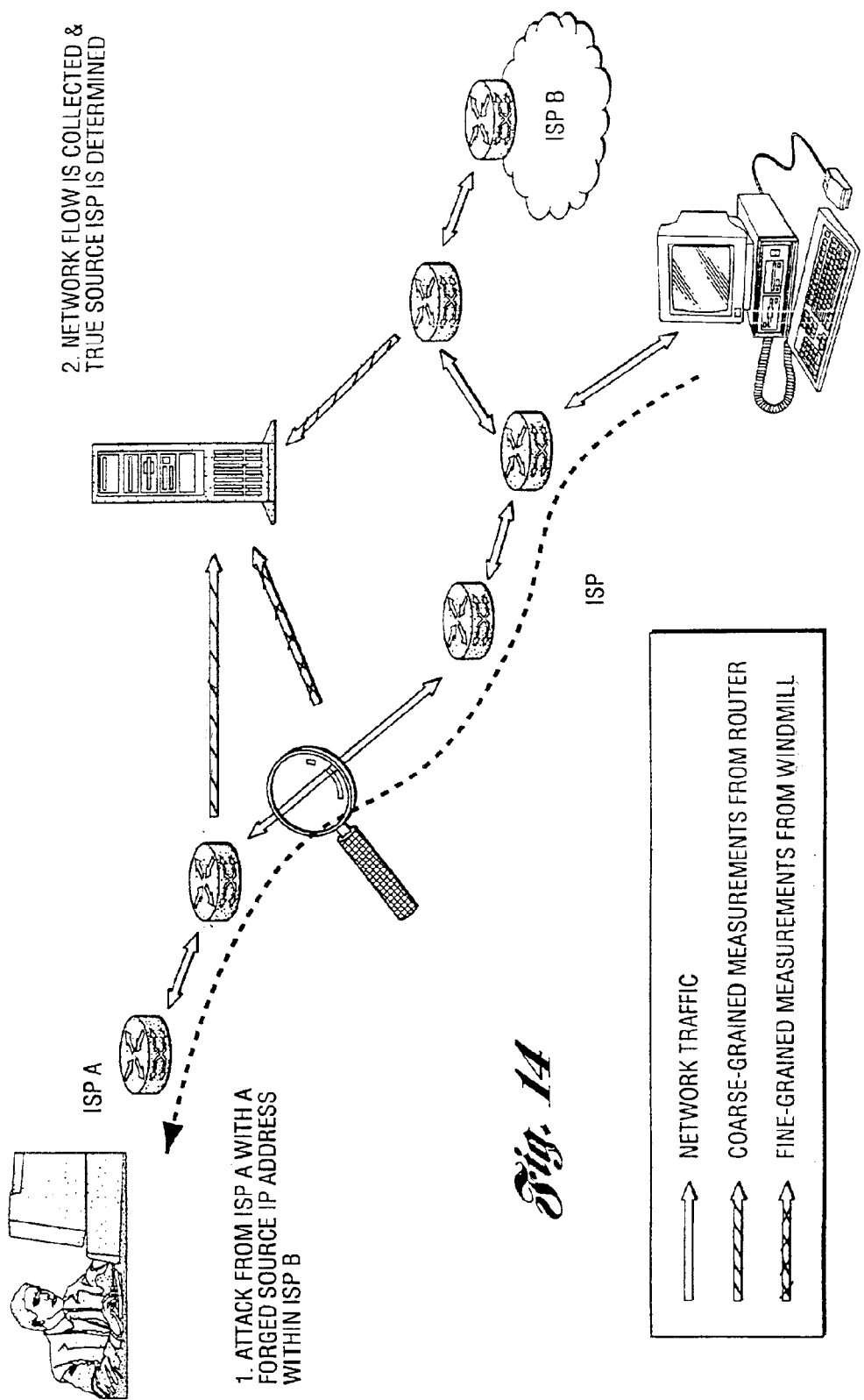
FIG. 14 is a schematic view illustrating backtracking a forged traffic source.

The overall system solution to denial of service attacks is comprehensive, sophisticated, scalable, and effective. The StormTools suite of solutions detect malicious attacks, as shown in FIG. 13, trace them back to their origin, as shown in FIG. 14, and remove their packets from the Internet, as shown in FIG. 15. Together they guarantee a host—such as a besieged Web server previously left incapacitated and unable to provide service to legitimate clients—sustained network connectivity to legitimate users.

While the best mode for carrying out the invention has been described in detail, those familiar with the art to which this invention relates will recognize various alternative designs and embodiments for practicing the invention as defined by the following claims.

What is claimed is:

1. A method for profiling network flows at a measurement point within a computer network, the method comprising:
   measuring network flows having invariant features at a measurement point located within routing infrastructure of the computer network to obtain flow statistics; and
   aggregating the flow statistics to obtain a traffic profile of the network flows at the measurement point wherein the step of aggregating is based on at least one of the invariant features and wherein the at least one invariant feature is either a source endpoint or a destination endpoint and wherein the step of aggregating is based on distance of the measurement point from the endpoint so that the network flow is profiled at the measurement point within the routing infrastructure in proportion to the distance from the measurement point to the endpoint.

2. The method as claimed in claim 1 wherein the invariant features include source and destination endpoints.

3. The method as claimed in claim 2 further comprising identifying typical traffic source and destination pairs for network flows that transit the measurement point based on the source and destination endpoints.

4. The method as claimed in claim 2 wherein the invariant features include protocol type.

5. The method as claimed in claim 4 wherein the invariant features include port information.

6. The method as claimed in claim 1 wherein the step of aggregating is based on temporal, static network and dynamic routing parameters.

7. The method as claimed in claim 1 further comprising identifying desired network flow characteristics based on dynamic routing and topology information.

8. The method as claimed in claim 1 wherein the computer network is the Internet.

9. A system for profiling network flows at a measurement point within a computer network, the system comprising:
   means for measuring network flows having invariant features at a measurement point located within routing infrastructure of the computer network to obtain flow statistics; and
   means for aggregating the flow statistics to obtain a traffic profile of the network flows at the measurement point wherein the flow statistics are aggregated based on at least one of the invariant features and wherein the at least one invariant feature is either a source endpoint or a destination endpoint and wherein the flow statistics are aggregated based on distance from the measurement point to the endpoint.

10. The system as claimed in claim 9 wherein the invariant features include source and destination endpoints.

11. The system as claimed in claim 10 further comprising means for identifying typical traffic source and destination pairs for network flows that transit the measurement point based on the source and destination endpoints.

12. The system as claimed in claim 10 wherein the invariant features include protocol type.

13. The system as claimed in claim 12 wherein the invariant features include port information.

14. The system as claimed in claim 9 wherein the flow statistics are aggregated based on temporal, static network and dynamic routing parameters.

15. The system as claimed in claim 9 further comprising means for identifying desired network flow characteristics based on dynamic routing and topology information.

16. The system as claimed in claim 9 wherein the computer network is the Internet.

17. The method as claimed in claim 1 wherein level of route aggregation is a measure of the distance.

18. The method as claimed in claim 1 further comprising utilizing physical and logical router interfaces at a highest level of aggregation.

19. The method as claimed in claim 1 wherein the distance is a logical distance with respect to forwarding topology.

20. The system as claimed in claim 9 wherein the system is capable of adapting to system resources in a dynamic fashion by reassignment of system resources to deal with possible aggregation levels.

* * * * *